United States Patent [19]
Warthen et al.

[11] 3,853,789
[45] Dec. 10, 1974

[54] PREPARATION OF MACROPOROUS ALUMINA EXTRUDATES

[76] Inventors: John Lawrence Warthen, 306 Chalfonte Dr., Baltimore, Md. 21228; Warren Stanley Briggs, 704 Brantford Ave., Silver Spring, Md. 20904; Frank George Ciapetta, deceased, late of 1628 Oaklawn Ct., Silver Springs, Md. 20903 by Carolina Ciapetta, executrix

[22] Filed: Mar. 9, 1973

[21] Appl. No.: 339,875

Related U.S. Application Data

[63] Continuation-in-part of Ser. No. 128,422, May 26, 1971, abandoned.

[52] U.S. Cl............ 252/463, 252/477 R, 423/600, 423/625, 423/628
[51] Int. Cl............................................ B01j 11/06
[58] Field of Search......... 252/463, 477 R; 423/600, 423/625, 628

[56] References Cited
UNITED STATES PATENTS

| | | | |
|---|---|---|---|
| 3,251,783 | 5/1966 | Keith et al. | 252/463 |
| 3,669,904 | 6/1972 | Cornelius et al. | 252/463 X |

*Primary Examiner*—Daniel E. Wyman
*Assistant Examiner*—W. J. Shine
*Attorney, Agent, or Firm*—Joseph P. Nigon

[57] ABSTRACT

Strong, attrition resistant, activated alumina extrudates, suitable for use as adsorbents or catalyst carriers and having large mercury pore volumes due to a combination of microporosity and macroporosity, are prepared by extruding specific proportions and particle size distributions of alumina monohydrate and gamma alumina powders.

4 Claims, 2 Drawing Figures

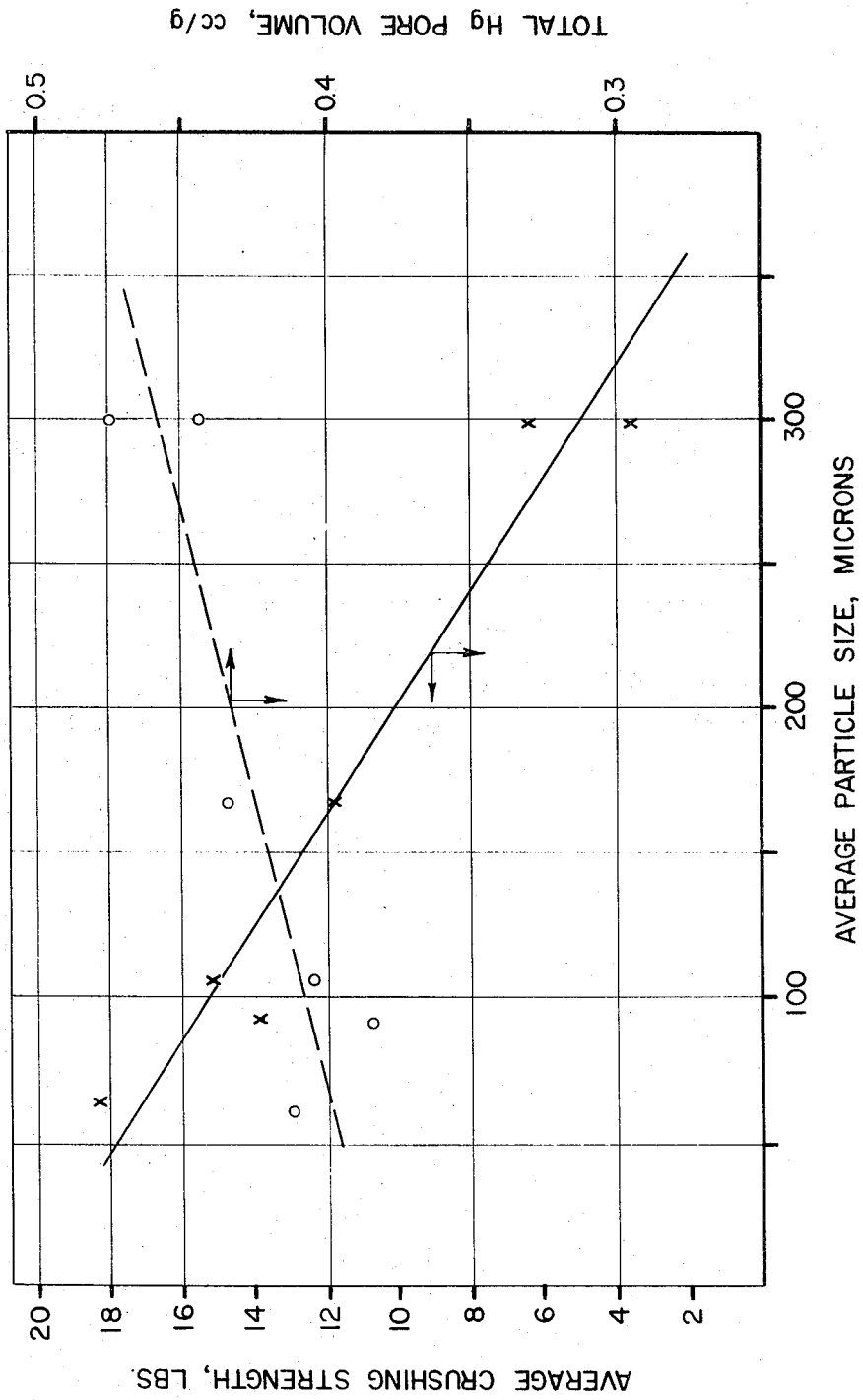

PREPARATION OF MACROPOROUS ALUMINA EXTRUDATES

This application is a continuation-in-part of USSN 128,422, filed May 26, 1971 now abandoned.

This invention relates to alumina extrudates of high strength and a high degree of macroporosity which can be employed as adsorbents or catalyst carriers. Activated aluminas have been used as supports for various types of catalysts for use in chemical processes and manufacturing industries. As an example, activated alumina is a common base or carrier at the present time for such varied catalysts as platinum, cobalt molybdate and chromia in the various catalytic reforming and cracking processes used by the petroleum industry. Such applications demand alumina particles having special crystalline structure and porosity depending somewhat upon the utilization to be made. Consideration must also be given to the wear or mechanical strength of the particles, be they agglomerates, microspheres or extrudates, especially when employed in continuous operations where they might be exposed to impact and to frictional abrasion. Unfortunately, the development of high mechanical strength in porous alumina particles is somewhat antagonistic to the production of particles having a high degree of porosity.

Aluminas have been produced recently which are especially well suited for catalytic processes involving viscose liquids such as would be encountered in the petroleum industry. These aluminas exhibit large surface areas due to the presence of micropores of less than 600A, and increased diffusion capacities attributable to macropores of the size range 1,000A to 100,000A.

Typically, these aluminas, produced by gel precipitation techniques, are in the form of agglomerates or spray-dried particles. These can be used in continuous or fluid bed catalytic processes. However, they have a tendency to attrit, i.e., break up into fines, which leads to losses in recycling and lowered catalytic efficiency.

Catalyst carriers in the form of small, hard extrudates are preferred for many fixed bed processes. However, it has been difficult to form sufficiently strong extrudates without using binders or hardeners which detrimentally affect the porosity of the finished alumina particle.

It is, therefore, an object of the present invention to provide a method for producing new and improved alumina extrudates, having substantial macroporosity, mechanical strength and attrition resistance, which are suitable for use as catalyst carriers and adsorbents.

It is another object to provide a method for producing improved alumina extrudates without the aid of binders or decomposable fillers.

These and still further objects of the present invention will become readily apparent to one skilled in the art from the following detailed description, specific examples and drawings wherein -

FIG. 2 is a graph of the effect of powder particle size on extrudate properties.

Figure 1:
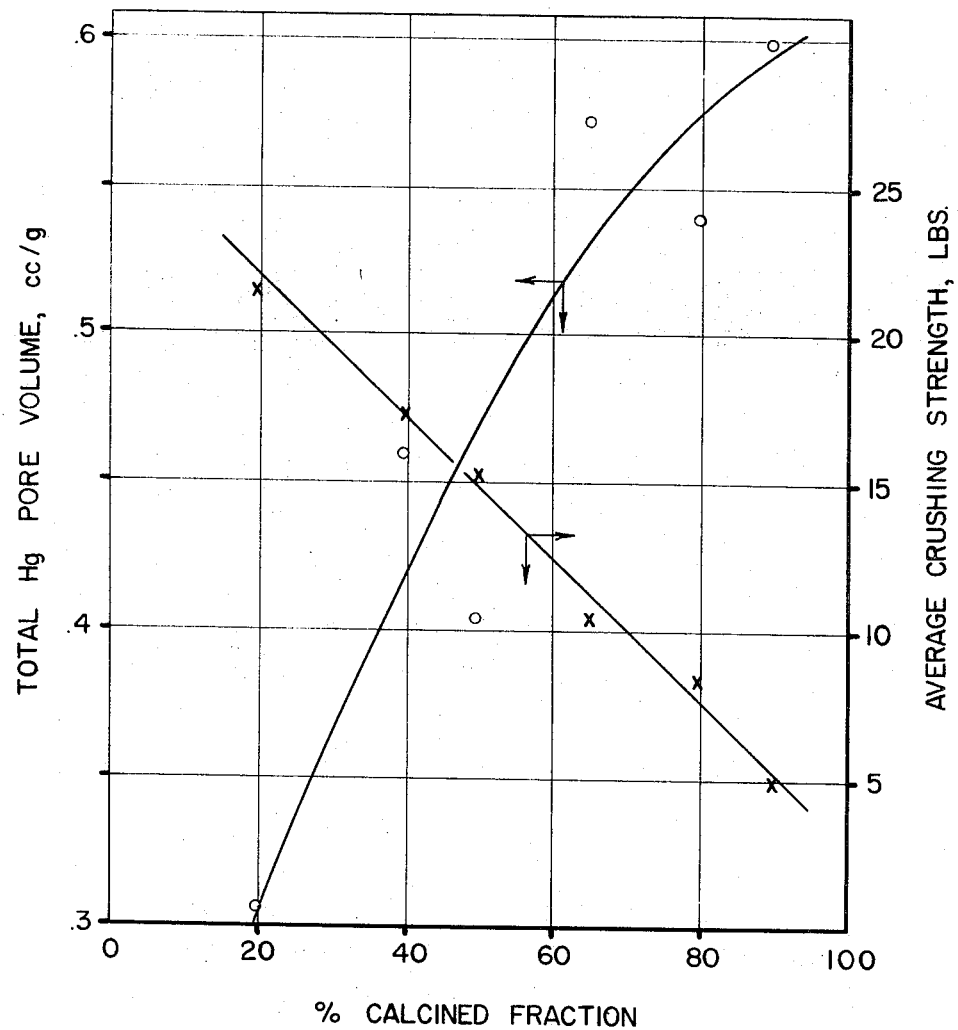
FIG. 1 is a graph showing the optimum ratio of gamma alumina, i.e., calcined, versus alumina monohydrate, i.e., dried, alumina powder for extrusion.

Broadly, this invention contemplates a method for preparing strong, attrition resistant, activated alumina extrudates having large mercury pore volumes due to a combination of microporosity and macroporosity, by extruding specific proportions and particle size distributions of alumina monohydrate and gamma alumina powders without the use of conventional binders.

More specifically, I have found that a mechanically strong macroporous adsorbent alumina product may be formed by preparing a mixture consisting of from 40 to 90 percent of gamma alumina particles having a size range of about 100 to 200 microns and from 10 to 60 percent alumina monohydrate particles having a size range of about 5 to 65 microns, adding to this mixture of aluminas sufficient water to form an extrudable paste; extruding the mixture; drying and calcining the resultant particles.

The macroporous alumina powders suitable for use in the present invention may be prepared by various known techniques, such as those disclosed in French Pat. No. 1,250,000, Pechiney.

To obtain the alumina powders used in the practice of the present invention, a hydrous alumina gel is precipitated from solution by either combining an alkali metal aluminate salt solution with an acid or an acid aluminum salt, or by precipitating an acid aluminum salt solution by the addition of an alkaline reagent. The precipitation reaction is conducted at a pH of between 6 and 11 and preferably between 7.5 and 8.5. Typically, a sodium aluminate solution is combined with an aluminum sulfate solution under conditions of vigorous agitation and in quantities so as to provide an alumina reaction mixture slurry which contains between 60 and 100 grams $Al_2O_3$ per liter. While sodium aluminate and alum are particularly useful for preparing the hydrous alumina gels, it is understood that aluminum salts, such as aluminum nitrate, aluminum chloride, and aluminum sulfate, may be precipitated by the addition of ammonia. Furthermore, alkaline aluminates, such as sodium aluminate, may be precipitated with mineral acid such as hydrochloric, sulfuric, or nitric acids.

The precipitation reaction is conducted so that the reactants remain in a reactor for a period of from about 8 to 20 minutes and preferably from 10 to 15 minutes. Preferably, the reaction mixture is maintained at a temperature of from about 25° to 45°C.

In a typical laboratory procedure, a reaction vessel is provided with stirring means and pH monitoring means. At the bottom of the reaction vessel, one tube is provided to provide sodium aluminate solution, a second tube is provided to supply alum solution. The flows of the sodium aluminate and alum solutions are controlled so as to provide a reaction mixture within the vessel, which contains between 60 and 100 grams $Al_2O_3$ per liter. During addition of the aluminate and sodium sulfate solutions, a hydrous aluminate gel is immediately formed. The gel is maintained within the reaction vessel for a period of about 8 to 20 minutes while maintaining its temperature at a temperature between 25° and 45°C. The top of the reaction vessel is open so as to permit constant overflow of reacted alumina gel slurry. This slurry is collected and stored in a tank located beneath the reaction vessel.

The reaction slurry is then filtered and the recovered alumina material is washed with water so as to remove soluble alkali metal and sulfate salts. To convert the hydrous precipitated alumina to the desired alumina monohydrate product, the filtered and washed alumina is dried by heating at a temperature of about 150° to 450°F. for a period of from about 8 to 24 hours. This heating converts the hydrous alumina slurry to alumina monohydrate.

To obtain the gamma alumina powder used as the second component in the practice of the present invention, the dried alumina monohydrate powder obtained above is heated, i.e., calcined, at a temperature of from about 1,000° to 1,550°F. for a period of from about 2 to 16 hours. This calcination converts the alumina monohydrate to the desired gamma alumina form.

The gamma alumina prepared by the above general procedure possesses a surface area on the order of 200 to 400 m²/g and a pore volume distribution such that more than about 40 of its pores are greater than 3,500 Angstrom units.

To prepare the extrudates of the present invention, porous granular alumina monohydrate, prepared as described above, that has been dried, is ground in a micropulverizer and screened to a specific average particle size. A portion of the alumina monohydrate powder is calcined as indicated above to obtain gamma alumina and combined with alumina monohydrate powder to form an optimum ratio of gamma to monohydrate material. The mixture is mulled with deionized water to an extrudable paste and extruded to ⅛ inch noodles. These are dried, heat treated at temperatures of 1150 to 1,250°F., and tested for crushing strength and mercury pore volume.

Mercury pore volume is obtained by forcing mercury into the pores. The measurement of mercury pore volume was accomplished by using a standard mercury porosimeter. The operation of this system is dependent on the fact that mercury can be forced into different sized pores depending on the pressure exerted. Thus, at 100 p.s.i. absolute pressure, mercury can be forced into pores having a diameter above about 17,500A. As the size of the pores decreases, the amount of pressure required to force mercury into the pores increases. This method is described in detail in the publication of Ritter, H. L., and Drake, L. D., Ind. Eng. Chem. Anal. Ed. 17, 787(1945). The mercury pore volumes reported in the data in this application were measured at pressures from 0 to 15,000 p.s.i.

Crushing strengths were measured by placing an individual alumina extrudate pellet in axially horizontal position on a flat plate and measuring the total force in pounds required to crush the same, the force being applied from above through 2 ⅜ inch diameter disc bearing on the top surface of the pellet.

FIG. 1 is a graph which relates the ratio of gamma alumina, i.e., calcined/alumina monohydrate, i.e., dry, alumina powder in the starting mixture to the properties of crushing strength and porosity in the final extrudate. Initial mixtures of a constant average particle size, i.e., 107 microns, were prepared spanning the range 100 percent calcined to 100 percent dry. Subsequently, these mixtures were formed into extrudates according to the steps described above. These extrudates were tested for mercury pore volume and crushing strength and the data recorded on the graph of FIG. 1.

It was found that 100 percent alumina monohydrate powder after extrusion produced strong nonporous extrudates, whereas 100 percent gamma alumina powder was practically unextrudable. Between these two extremes the graph shows that as the percent gamma alumina fraction increases, the strength of the particles decreases, while the porosity increases substantially.

The graph represented in FIG. 2 relates average particle size of the initial alumina powder mixture to the properites of strength and porosity. In this case, the ratio of gamma/monohydrate alumina powder was kept at a constant 50/50 and the average particle size was varied from 50 to 300 microns. It can be seen that as coarser particles are used as a starting material, the pore volume of the extrudates increases slightly while the strength decreases significantly.

In order to maximize the strength and pore volume of the product particles, the alumina powder mixture used in the present invention should have an average particle size of from 50 to 150 microns, more specifically, the monohydrate alumina fraction should be made up of particles about 62 microns in average size and the gamma alumina fraction should range from 100 to 200 microns.

The initial alumina powder composite should contain from 40 to 90 percent by weight gamma alumina, the remainder being made up by alumina monohydrate powder.

Extrudates formed from this mixture and calcined at 1,150° to 1,250°F. for about 2 to 6 hours are strong, hard, and have total mercury pore volumes about 0.3 to 0.7 cc/g. with about 40 to 100 percent of this volume in pores greater than 3,500A in diameter and a surface area of 200 to 400 m²/g. These particles are extremely well suited for use as catalyst carriers and adsorbents.

Having described the basic aspects of the present invention, the following specific examples are given to illustrate embodiments thereof.

EXAMPLE 1

In this example, the preparation of the macroporous alumina monohydrate starting material is illustrated.

22.5 liters of an 0.58 molar sodium aluminate solution were continuously neutralized in a 2,400 cc reactor with enough 6.5 molar nitric acid to maintain a pH equal to 8.5. The temperature during the neutralization was kept at a constant 104°F. and the average residence time of the slurry in the reactor was 11.8 minutes. 26.8 liters of slurry were collected having a pH of 8.5, aged overnight, and filtered on two 21 inch tub filters. Each cake was washed four times on the filter with 12 liters of deionized water. The cake was then dried at 240°F. in a forced draft oven. Samples of the alumina monohydrate were taken to determine pore volume and percent Na₂O. The results were: mercury pore volume = 0.396 cc/g., 59.3 percent of which involved pores >3500A, percent Na₂O = 0.041 wt. percent.

EXAMPLE 2

This example illustrates the procedure used to form the novel extrudates of the present invention.

Granular alumina monohydrate prepared according to the method set forth in Example 1 that had been dried at 220°F. was ground in a micropulverizer at 14,000 RPM with a Bantam Screen No. 3460. Samples of this powder were heated 3 hours at 1,200°F. to convert it to gamma alumina. The gamma alumina powder was combined with monohydrate powder to give a 90 percent – 10 percent alumina monohydrate powder mixture. One sample possessed an Average Particle Size (APS) of around 107 microns, and other samples possessed an APS of 165 microns. 180 grams of these powder mixtures were mulled with 164.8 cc. deionized water to obtain an extrudable paste. This was extruded at about 1,500 psi pressure in a Loomis 25 ton extruder to ⅛ inch noodles. The noodles were subsequently dried at 200°F., further heat treated at 1,200°F. for three hours to convert the entire product to gamma alumina, and finally tested for crushing strength and mercury pore volume. The results of several of these runs are tabulated below:

Table I

| No. | gamma alumina (wt.%) | alumina monohydrate (wt.%) | ACS | HgPV | >3500A | Remarks |
| --- | --- | --- | --- | --- | --- | --- |
| 1 | 90 | 10 | 5.1 | .600 | .414 | APS Mix=107 microns |
| 2 | 90 | 10 | 8.8 | .705 | .461 | APS: gamma =196 microns monohydrate= 62 microns mix =165 microns |
| 3 | 0 | 100 | 34.6 | .210 | .108 | Reference data |
| 4 | 100 | 0 | 0 | .594 | .413 | Poor exrudates |

It can be seen from the data above that No. 2 represents the most desirable combination of the properties of strength and porosity and would constitute an example of a commercial embodiment of the present invention.

The aforementioned specific examples clearly indicate that useful binderless alumina extrudates can be obtained using the teachings of the present invention.

We claim:

1. A method for preparing mechanically strong macroporous alumina extrudates having a mercury pore volume of about 0.3 to about 0.7 cc/g wherein 40 to 100 percent of the pore volume is contained in pores having a size above 3500A in diameter, and a surface area of about 200 to 400 m²/g which comprises:

a. preparing a mixture which comprises:
  1. 40 to 90 percent by weight gamma alumina powder having a particle size range of about 100 to 200 microns, and
  2. 10 to 60 percent by weight alumina monohydrate particles having a size range of about 5 to 65 microns;

b. combining said mixture with water to form an extrudable paste;

c. extruding said paste to form cohesive extrudates; and d. drying and calcining the extrudate to form hard mechanically strong particles.

2. The method of claim 1 wherein said gamma alumina is prepared by calcining alumina hydrogel at a temperature of 1,000° to 1,550°F. for 2 to 16 hours.

3. The method of claim 1 wherein said alumina monohydrate is prepared by heating alumina hydrogel to a temperature of 150° to 400°F. for 8 to 24 hours.

4. The method of claim 1 wherein said cohesive extrudates are calcined at a temperature of 1,150° to 1,250°F. for 2 to 6 hours.

* * * * *